United States Patent
Singla et al.

(10) Patent No.: US 10,431,101 B2
(45) Date of Patent: Oct. 1, 2019

(54) SYSTEM AND METHOD FOR CUSTOMIZING A SEARCH AND RESCUE PATTERN FOR AN AIRCRAFT

(71) Applicant: HONEYWELL INTERNATIONAL INC., Morris Plains, NJ (US)

(72) Inventors: Abneesh Singla, Karnataka (IN); Vageesh S, Karnataka (IN); Visvanathan Thanigai Nathan, Karnataka (IN); Sudarshan Parthasarathy, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 98 days.

(21) Appl. No.: 15/601,062

(22) Filed: May 22, 2017

(65) Prior Publication Data

US 2018/0336788 A1  Nov. 22, 2018

(51) Int. Cl.
*G08G 5/00* (2006.01)
*G06F 3/0488* (2013.01)

(52) U.S. Cl.
CPC ......... *G08G 5/0047* (2013.01); *G06F 3/0488* (2013.01); *G08G 5/003* (2013.01); *G08G 5/0013* (2013.01); *G08G 5/0021* (2013.01); *G08G 5/0034* (2013.01); *G08G 5/0008* (2013.01)

(58) Field of Classification Search
CPC .. G08G 5/0047; G08G 5/0013; G08G 5/0021; G08G 5/003; G08G 5/0034; G08G 5/0008; G06F 3/0488
See application file for complete search history.

(56) References Cited

U.S. PATENT DOCUMENTS

| | | |
|---|---|---|
| 7,761,234 B2 | 7/2010 | Winkler et al. |
| 8,744,760 B1 | 6/2014 | Mishmash et al. |
| 9,262,931 B2 | 2/2016 | Parthasarathy |
| 9,273,969 B2 | 3/2016 | Parthasarathy |
| 2013/0345905 A1 | 12/2013 | Parthasarathy |
| 2015/0066248 A1 | 3/2015 | Arbeit et al. |

(Continued)

FOREIGN PATENT DOCUMENTS

| | | |
|---|---|---|
| WO | 2004044694 A2 | 5/2004 |
| WO | 2015177187 A1 | 11/2015 |
| WO | 2016096415 A1 | 6/2016 |

OTHER PUBLICATIONS

Machine Translation WO 2015/177187 published Nov. 2015.*

(Continued)

*Primary Examiner* — Anne M Antonucci
*Assistant Examiner* — Renee LaRose
(74) *Attorney, Agent, or Firm* — Lorenz & Kopf, LLP (57) ABSTRACT

Systems and methods are provided for customizing a search and rescue (SAR) pattern for an aircraft. A search and rescue pattern system (SARPS) is configured to obtain SAR mission information from a SAR information database, weather information from a weather source, terrain information from a terrain database, and the flight traffic information. The SARPS is further configured to generate a customized SAR pattern using the obtained mission information, the weather information, the terrain information, and the flight traffic information. A display is configured to display the customized SAR pattern and a flight management system (FMS) is configured to receive the customized SAR pattern.

17 Claims, 5 Drawing Sheets

(56) References Cited

U.S. PATENT DOCUMENTS

2016/0078769 A1   3/2016   Coulmeau et al.
2016/0292403 A1   10/2016  Gong et al.

OTHER PUBLICATIONS

Partial EP Search Report for Application No. 18171957.6 dated Oct. 10, 2018.
Arbeit, A.; Adaptation and Automation of Search and Rescue Patterns with Implementation for an Operational Unmanned Aircraft System; A thesis submitted in partial fulfillment of the requirements for the degree of Master of Science in Aeronautics & Astronautics University of Washington 2013.

* cited by examiner

SYSTEM AND METHOD FOR CUSTOMIZING A SEARCH AND RESCUE PATTERN FOR AN AIRCRAFT

TECHNICAL FIELD

The exemplary embodiments described herein generally relate to flight planning for aircraft navigation and more particularly to customizing search and rescue (SAR) patterns for aircraft.

BACKGROUND

When vehicles or individuals go missing in terrain or sea, search and rescue (SAR) procedures may be employed by aircraft, watercraft, and ground based vehicles, to systematically search the area. Compared to ground based vehicles, aircraft can visually search large areas of terrain or sea that is remote or difficult to navigate while dealing with inclement weather.

In order to adapt SAR patterns to the unique search area and its terrain and weather, typically, the pilot is tasked with modifying the search pattern to maximize search efficiency. Not only does this take time, but it distracts the pilot and leads to mistakes or missed areas while the pilot is modifying the SAR pattern. Furthermore, conventional methods for modifying a SAR pattern are not intuitive. For example, once SAR patterns are inserted into a flight management system (FMS), pilots can only make very limited changes to modify the pattern such as adjusting the speed, initial leg length, space, or turn direction. This poses certain restrictions while executing the SAR mission such as when the weather changes or when visibility or the terrain necessitates a change in individual leg of a chosen SAR pattern.

Furthermore, conventional systems do not suggest a suitable SAR pattern and parameters for a successful completion of the mission. Currently, pilots choose among the existing SAR patterns based on the information provided to them about the SAR mission and their prior experience. While experience is extremely valuable, no pilot can consider all the information available for the SAR mission such as current weather including the visibility, terrain conditions, and flight parameters of the aircraft itself. For example, visibility is extremely important for spotting the targets of the SAR mission. Changing visibility, prevailing fog, and smog conditions would adversely impact the SAR mission and therefore need to be considered when selecting the SAR pattern and when flying the SAR pattern during the SAR mission.

Accordingly, it is desirable to provide a system and method for a SAR pattern for an aircraft. Furthermore, other desirable features and characteristics of the exemplary embodiments will become apparent from the subsequent detailed description and the appended claims, taken in conjunction with the accompanying drawings and the foregoing technical field and background.

BRIEF SUMMARY

In an exemplary embodiment, a system for customizing a search and rescue (SAR) pattern includes a SAR information database configured to store mission information for a SAR mission about a search area and a weather source configured to provide weather information relating to the search area. The system further includes a terrain database configured to store terrain information relating to the search area and a flight traffic source configured to provide flight traffic information relating to the search area. The system further includes a search and rescue pattern system (SARPS) configured to obtain the mission information, the weather information, the terrain information, and the flight traffic information. The SARPS is further configured to generate a customized SAR pattern using the obtained mission information, the weather information, the terrain information, and the flight traffic information. The system further includes a display configured to display the customized SAR pattern and a flight management system (FMS) configured to receive the customized SAR pattern.

In an exemplary embodiment, a method for customizing a search and rescue (SAR) pattern includes obtaining mission information for a SAR mission about a search area and obtaining weather information, from a weather source, relating to the search area. The method further includes obtaining terrain information, from a terrain database, relating to the search area and obtaining flight traffic information, from a flight traffic source, relating to the search area. The method further includes generating a customized SAR pattern using the obtained mission information, the weather information, the terrain information, the flight traffic information, and at least one of a flight crew input, a ground crew input, a search team composition, or a combination thereof. The method further includes displaying the customized SAR pattern at least one of a flight crew, a ground crew, a search team member, or a combination thereof with a display device and providing a flight management system (FMS) with the customized SAR pattern.

BRIEF DESCRIPTION OF THE DRAWINGS

The present invention will hereinafter be described in conjunction with the following drawing figures, wherein like numerals denote like elements, and 1 is a block diagram of an exemplary system for customizing a SAR pattern in accordance with the present disclosure.

DETAILED DESCRIPTION

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the preceding technical field, background, brief summary, or the following detailed description.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments. Any of the above devices are exemplary, non-limiting examples of a computer readable storage medium.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Any of the above devices are exemplary, non-limiting examples of a computer readable storage medium In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

As detailed above, conventional SAR patterns are comparatively static in their design, require significant input from the pilot, and do not take into consideration dynamic factors such as the weather, terrain of the search, and aircraft parameters. The present disclosure provides an intelligent SAR pattern that is customized to suit the specific SAR mission and takes into consideration the aircraft parameters, weather, and terrain conditions based on the available information. In this way, the customized SAR pattern increases the probability for successful execution of the SAR mission by overcoming the weather and terrain limitations posed during the SAR mission. The disclosed customized SAR pattern is also flexible and allows the crew to easily modify the individual legs at will during the SAR mission based on the weather conditions and other factors.

Figure 1:
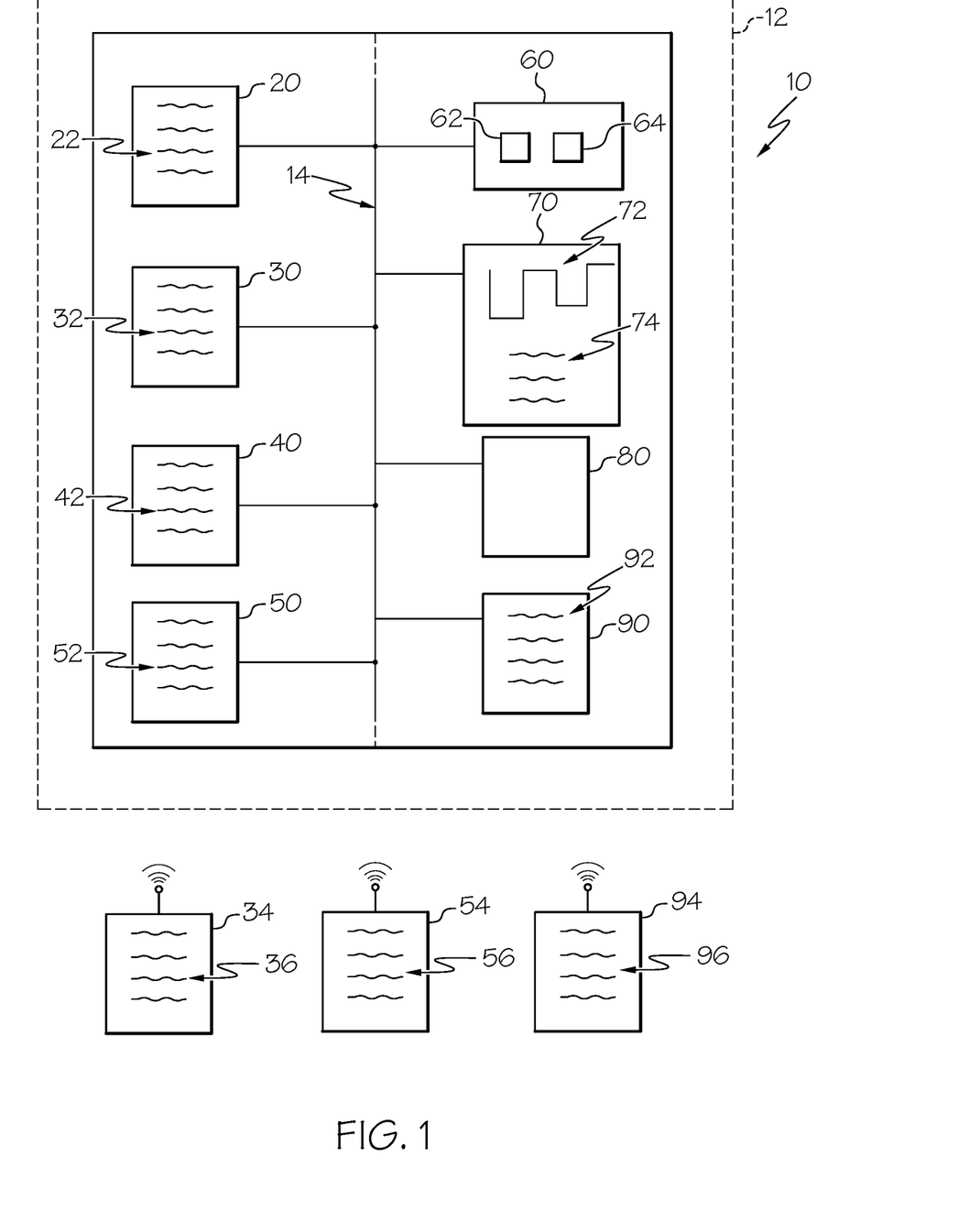

With reference now to FIG. 1, a system 10 for customizing a search and rescue (SAR) pattern for an aircraft 12. The system 10 is generally implemented in the aircraft 12, however, in a non-limiting embodiment, the system 10 is implemented in other vehicles including, helicopters, and the like. The system 10 includes a SAR information database 20, a weather source 30, a terrain database 40, a flight traffic source 50, a search and rescue pattern system 60, a display 70, and a flight management system 80. In a non-limiting embodiment, the various components of the system 10 are in communication via a bus 14 on the aircraft 12.

The SAR information database 20 stores mission information 22 for a SAR mission about a search area. The SAR information database 20 is in communication with the bus 14. The mission information 22 includes, but is not limited to, a last known location of the SAR target, a time of last contact, identifying information about the SAR target, the type of target, or other such information particular to the SAR mission. Generally, the mission information 22 provides overall context to the SAR mission.

The weather source 30 provides weather information 32 relating to the search area. The weather source 30 is in communication with the bus 14. The weather information 32 includes, but is not limited to, wind speed, ceiling, visibility, cloud base, and forecast relating to the search area. Generally, the weather information 32 is describes the current and predicted weather for the search area that would be useful to the aircraft 12.

In a non-limiting embodiment, a remote weather source 34 is remote from the aircraft 12. For example, the remote weather source 34 transmits weather information 36 to the aircraft 12 wirelessly. Such remote weather sources 34 are known to one skilled in the art and provide local weather information 36. The method by which the remote weather source 34 communicates with the system 10 is not contemplated by the present disclosure.

The terrain database 40 stores terrain information 42 relating to the search area. The terrain database 40 is in communication with the bus 14. The terrain information 42 includes, but is not limited to, topographical data, ground type, and the environment relating to the search area. For example, the terrain information 42 includes physical features, roads, waterways, forests, clearings, and other information to aid in the identification of the SAR target within the search area.

The flight traffic source 50 provides flight traffic information 52 relating to the search area. The flight traffic source 50 is in communication with the bus 14. The flight traffic information 52 includes information about flight plans of other aircraft proximate to the search area, restricted airspace, or areas of high traffic, such as near an airport. In a non-limiting embodiment, the flight traffic information 52 includes stored flight paths of aircraft that flew over the search area and is updated periodically using the automatic dependent surveillance broadcast (ADS-B) information from those aircraft.

In a non-limiting embodiment, a remote flight traffic source 54 is remote from the aircraft 12. For example, the remote flight traffic source 54 transmits flight traffic information 56 to the aircraft 12 wirelessly. A non-limiting example of a remote flight traffic source 54 includes an air traffic controller. Such a remote flight traffic source 54 can reliably provide the aircraft 12 with updated flight traffic information 56 relating to the search area.

The search and rescue pattern system (SARPS) 60 is in communication with the bus 14. In a non-limiting embodiment, the SARPS 60 includes a processor 62 and a memory 64. The processor 62 is configured to execute the instructions stored on the memory 64 and to query data from the various databases of the system 10. While the SARPS 60 is depicted herein as a separate hardware module, one skilled in the art will appreciate that the SARPS 60 may alternatively be implemented as a software module within an existing aircraft 12 system without departing from the spirit of the present disclosure.

The SARPS 60 is configured to obtain the mission information 22, the weather information 32, the terrain information 42, and the flight traffic information 52 from the previously recited components of the system 10. The SARPS is further configured to generate a customized SAR pattern using the obtained mission information, the weather information, the terrain information, and the flight traffic information. In a non-limiting example, if the mission information 22 identifies that the SAR target was on foot, the SARPS 60 may generate the customized SAR pattern that focuses on the area surrounding the last known whereabouts of the SAR target and expanding radially outward. In a non-limiting example, if the weather information 32 indicates that there is low visibility, the SARPS 60 may reduce the altitude of the customized SAR pattern and the distance between legs while, conversely, if the weather information 32 indicates a high visibility, the SARPS 60 may generate a customized SAR pattern with a higher altitude and increased distance between legs to take advantage of the long sightlines. In a non-limiting example, if the terrain information 42 indicates that certain portions of the search area are wide open fields while other portions are dense forest, the SARPS 60 may generate a customized SAR pattern that only focuses more on the forest portions as these portions have reduced visibility relative to the open fields. In a non-limiting example, if the flight traffic information 52 indicates that portions of the search area have high aircraft traffic or are restricted, the SARPS 60 may generate a customized SAR pattern that avoids these areas. In this way, the SARPS 60 makes uses of the available information to design a customized SAR pattern that takes into consideration dynamic factors that may influence the SAR pattern.

In a non-limiting embodiment, based on the cloud base, the SARPS 60 may generate a customized SAR pattern that is well below the cloud base to ensure that the aircraft 12 has an unrestricted view of the target.

The display 70 is in communication with the bus 14 and is configured to display the customized SAR pattern 72 to a flight crew. In a non-limiting embodiment, the display 70 is a touch screen display capable of receiving touch based inputs from the flight crew. In a non-limiting example, the display 70 displays the customized SAR pattern 72 and the flight crew is able to manipulate and adjust portions of the customized SAR pattern 72, as will be discussed in greater detail below. In a non-limiting embodiment, the display 70 is further configured to display the mission information 22, the weather information 32, the terrain information 42 and the flight traffic information 52, which is generally shown as displayed information 74. In this way, the flight crew is provided with the displayed information 74 which, as discussed above, was used to generate the customized SAR pattern 72 which may be of further use to the flight crew.

The FMS 80 is in communication with the bus 14 and is configured to receive the customized SAR pattern. The FMS 80 is known to those skilled in the art and is generally a avionics system that handles in-flight management of the flight plan. The FMS 80 uses various navigation sensors to determine the aircraft's 12 position and guide the aircraft 12 along the flight plan, or in this case, the customized SAR pattern. In this way, the system 10 provides a customized SAR pattern that takes advantage of information from various sources to increase the likelihood of a successful SAR mission.

In a non-limiting embodiment, the system 10 further includes a SAR pattern database 90 that is in communication with the bus 14. The SAR pattern database 90 is configured to store a plurality of template SAR patterns 92. In a non-limiting embodiment, the SARPS 60 is further configured to store the customized SAR pattern in the SAR pattern database 90 for future use.

In a non-limiting embodiment, a remote SAR pattern database 94 is remote from the aircraft 12. For example, the remote SAR pattern database 94 receives the customized SAR pattern from to aircraft 12 wirelessly. In this way, the remote SAR pattern database 94 receives the customized SAR pattern from the aircraft 12 to be stored with a plurality of template SAR patterns 96.

In a non-limiting embodiment, the SARPS 60 is configured to share the customized SAR pattern with other aircraft or vehicles (not shown) in the SAR mission. In a non-limiting example, the system 10 of the aircraft 12 customizes a SAR pattern and shares the customized SAR pattern with other aircraft or vehicles in the SAR mission such that multiple aircraft or vehicles can work together to carry out the customized SAR pattern. This may be useful when the search area is comparatively large so that rather than having multiple aircraft carrying out individual SAR patterns, the multiple aircraft can work cooperatively to divide up the search area and more efficiently carry out the customized SAR pattern.

In a non-limiting embodiment, the SARPS 60 is further configured to select at least one template SAR pattern 92 from the SAR pattern database 90 using the obtained mission information, the weather information, the terrain information, and the flight traffic information. The SARPS 60 then generates the customized SAR pattern based on the at least one template SAR pattern 92 and the obtained mission information, the weather information, the terrain information, and the flight traffic information. In a non-limiting example, the SARPS 60 selects at least one template SAR pattern 92 and modifies the selected template SAR pattern 92 to generate the customized SAR pattern.

Now with reference to FIGS. 2A-2E and with continued reference to FIG. 1, exemplary SAR patterns and SAR pattern modifications suitable for use with the system 10 of are depicted herein. The exemplary SAR patterns from FIGS. 2A-2E are for illustrative purposes and are not intended to be limiting with respect to the exact shape of the customized SAR patterns. In particular, FIGS. 2A-2E depict how a member of the flight crew can use the display 70 to easily adjust a portion of the template SAR pattern 92.

Figure 2A:
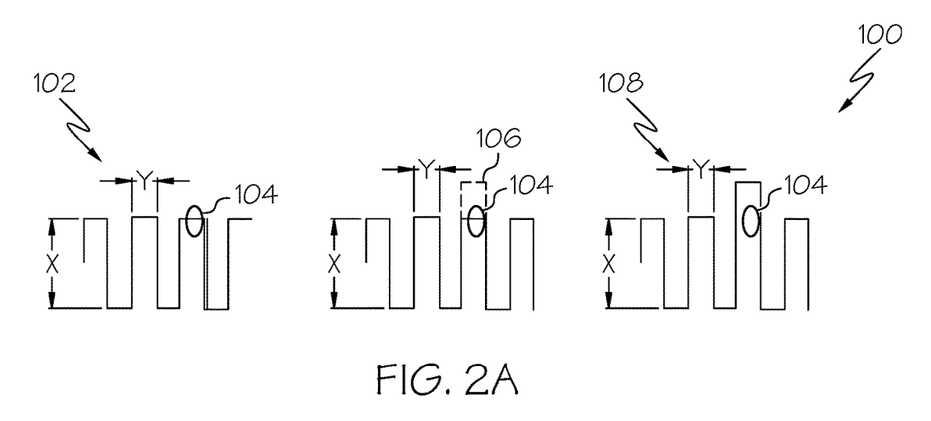
FIGS. 2A-2E depict exemplary SAR patterns and SAR pattern modifications suitable for use with the system of FIG. 1 in accordance with the exemplary embodiments.

FIG. 2A depicts a creeping ladder SAR pattern 100. When the initial creeping ladder SAR pattern 102 is displayed on the display 70 to the flight crew, the flight crew may wish to modify the initial ladder SAR pattern 102 to encompass area 104. In a non-limiting embodiment, a flight crew member drags a portion 106 of the initial ladder SAR pattern 102 to encompass area 104. The adjusted ladder SAR pattern 108 now encompasses area 104. The adjusted ladder SAR pattern 108 is then provided to the FMS 80.

Figure 2B:
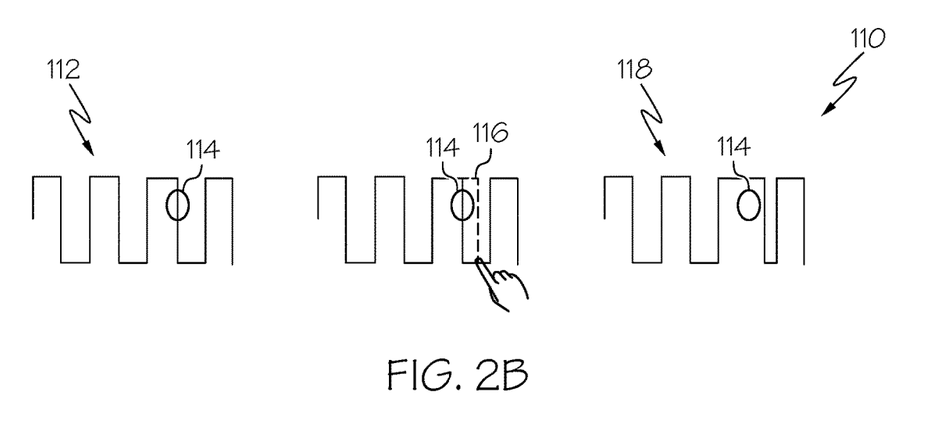

Similar to FIG. 2A, FIG. 2B depicts a creeping ladder SAR pattern 110. When the initial creeping ladder SAR pattern 112 is displayed on the display 70 to the flight crew, the flight crew may wish to modify the initial ladder SAR pattern 112 to encompass area 114. In a non-limiting embodiment, a flight crew member drags a portion 116 of the initial ladder SAR pattern 112 to encompass area 114. The adjusted ladder SAR pattern 118 now encompasses area 114. The adjusted ladder SAR pattern 118 is then provided to the FMS 80.

Figure 2C:
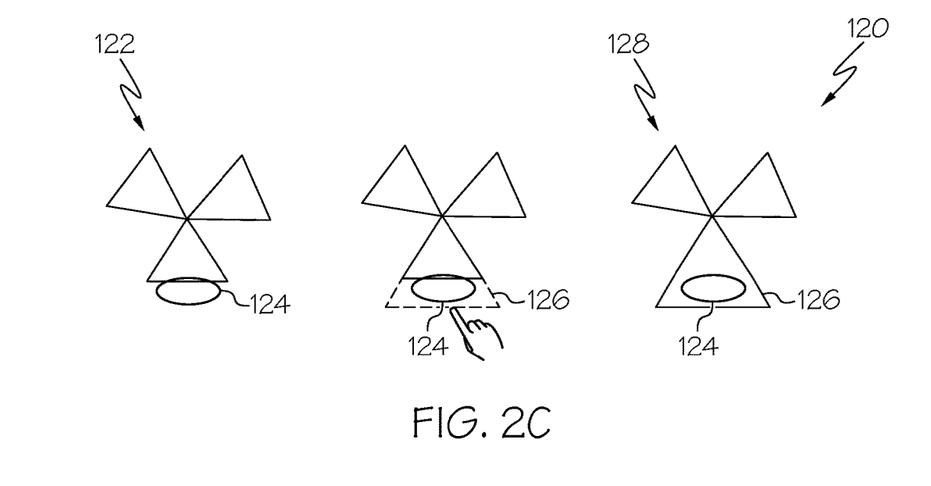

Similar to FIGS. 2A and 2B, FIG. 2C depicts a sector SAR pattern 120. When the initial sector SAR pattern 122 is displayed on the display 70 to the flight crew, the flight crew may wish to modify the initial sector SAR pattern 122 to encompass area 124. In a non-limiting embodiment, a flight crew member drags a portion 126 of the initial sector SAR pattern 122 to encompass area 124. The adjusted sector SAR pattern 128 now encompasses area 124. The adjusted sector SAR pattern 128 is then provided to the FMS 80.

Similar to FIGS. 2A-2C, FIG. 2D depicts an expanding square SAR pattern 130. When the initial expanding square SAR pattern 132 is displayed on the display 70 to the flight crew, the flight crew may wish to modify the initial expanding square SAR pattern 132 to encompass area 134. In a non-limiting embodiment, a flight crew member drags a portion 136 of the initial expanding square SAR pattern 132 to encompass area 134. The adjusted expanding square SAR pattern 138 now encompasses area 134. The adjusted expanding square SAR pattern 138 is then provided to the FMS 80.

Figure 2D:
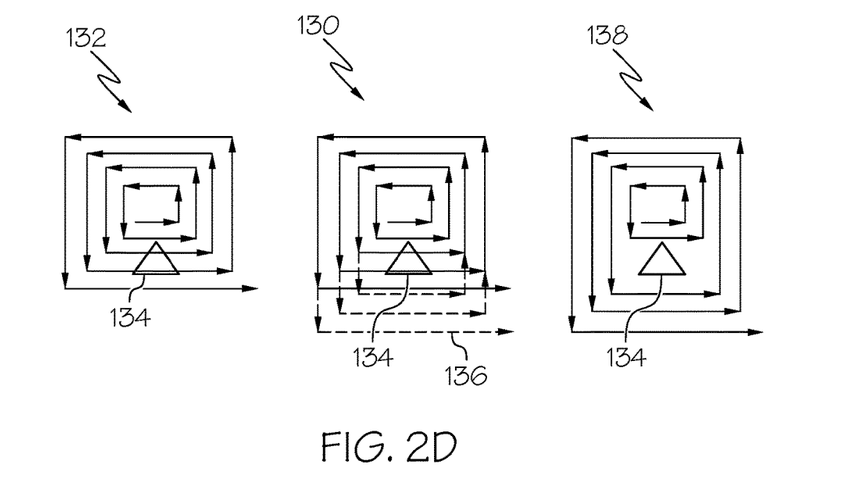
Figure 2E:
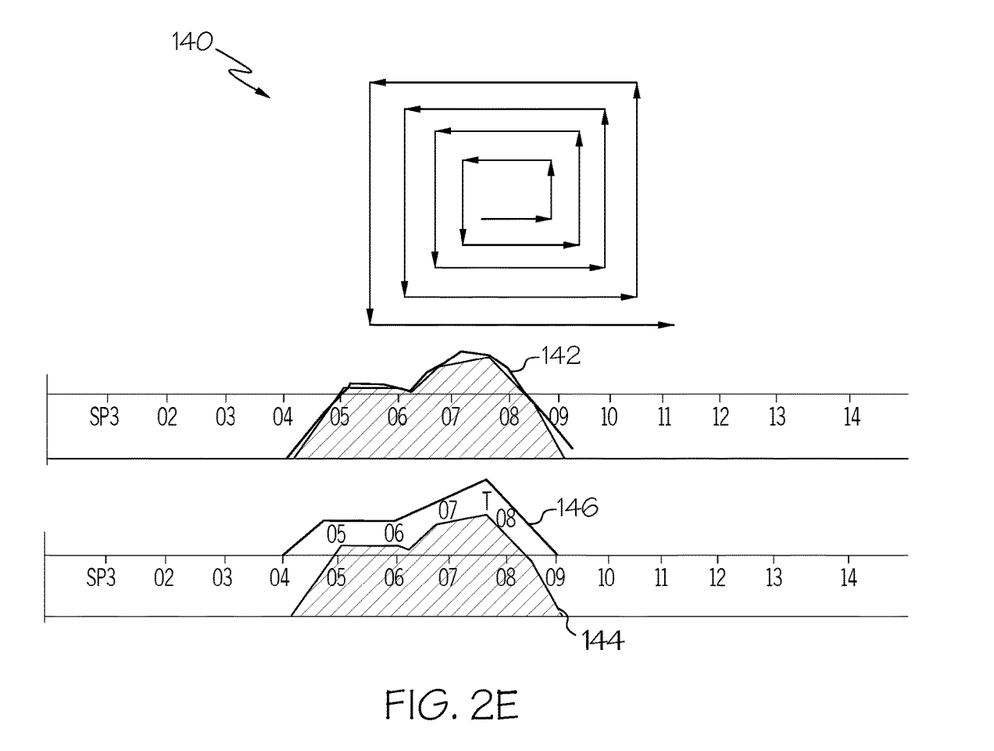

With reference now to FIG. 2E, a vertical flight plan modification 140 to the template SAR pattern 94 is depicted. In addition to the path the SAR pattern takes over the search area, the vertical profile may also be adjusted. In a non-limiting example, the template SAR pattern 92 has an initial vertical profile 142. The flight crew may wish to modify the initial vertical profile 142 to avoid area 144. In a non-limiting embodiment, a flight crew member drags a portion 146 of the initial vertical profile 142 to avoid area 144. The adjusted vertical profile now avoids area 144. The adjusted vertical profile is then provided to the FMS 80.

In a non-limiting embodiment, the SARPS 60 is further configured to adjust a portion of the at least one template SAR pattern 92 using a user input. As detailed above, the user input may be a physical manipulation of the template SAR pattern 92 on a touchscreen of the display 70 or, in a non-limiting example, may be input using a mouse or other input device. In a non-limiting embodiment, the SARPS 60 is configured to adjust a lateral leg of the template SAR pattern 92, a vertical leg of the template SAR pattern 92, or a combination thereof. As discussed with respect to FIGS. 2A-2E the SAR pattern may be manipulated in both the lateral direction, ie the direction of travel over the ground, in the vertical direction, or a combination thereof.

In a non-limiting embodiment, the SARPS 60 is configured to adjust a portion of the template SAR pattern 92 using an aircraft performance parameter, the SAR mission information 22, the weather information 32, the terrain information 42, the flight traffic information 52, or a combination thereof. In a non-limiting embodiment, the aircraft performance parameters are associated with specific aircraft 12. Each set of aircraft performance parameters are unique to a specific aircraft 12 and describe how the aircraft 12 performs.

In a non-limiting embodiment, the SARPS 60 is configured to store the adjusted SAR pattern in the SAR pattern database 90 and share the adjusted SAR pattern with the other aircraft (not shown) in the SAR mission. As detailed above, the adjusted SAR pattern may be stored in the SAR pattern database 90 for future use in SAR missions or shared with other aircraft in the SAR mission.

The components of the system 10 have been shown as discrete blocks in the representation of FIG. 1 to aid in understanding how the system 10 customizes a SAR pattern for the aircraft 12. However, one skilled in the art will appreciate that the components of the system 10 may be combined with one another in various forms without departing from the spirit of the present disclosure.

It should be understood that FIG. 1 is a simplified representation of a system 10 for purposes of explanation and ease of description, and FIG. 1 is not intended to limit the application or scope of the subject matter in any way. In practice, the system 10 and/or aircraft 12 will include numerous other devices and components for providing additional functions and features, as will be appreciated in the art.

Figure 3:
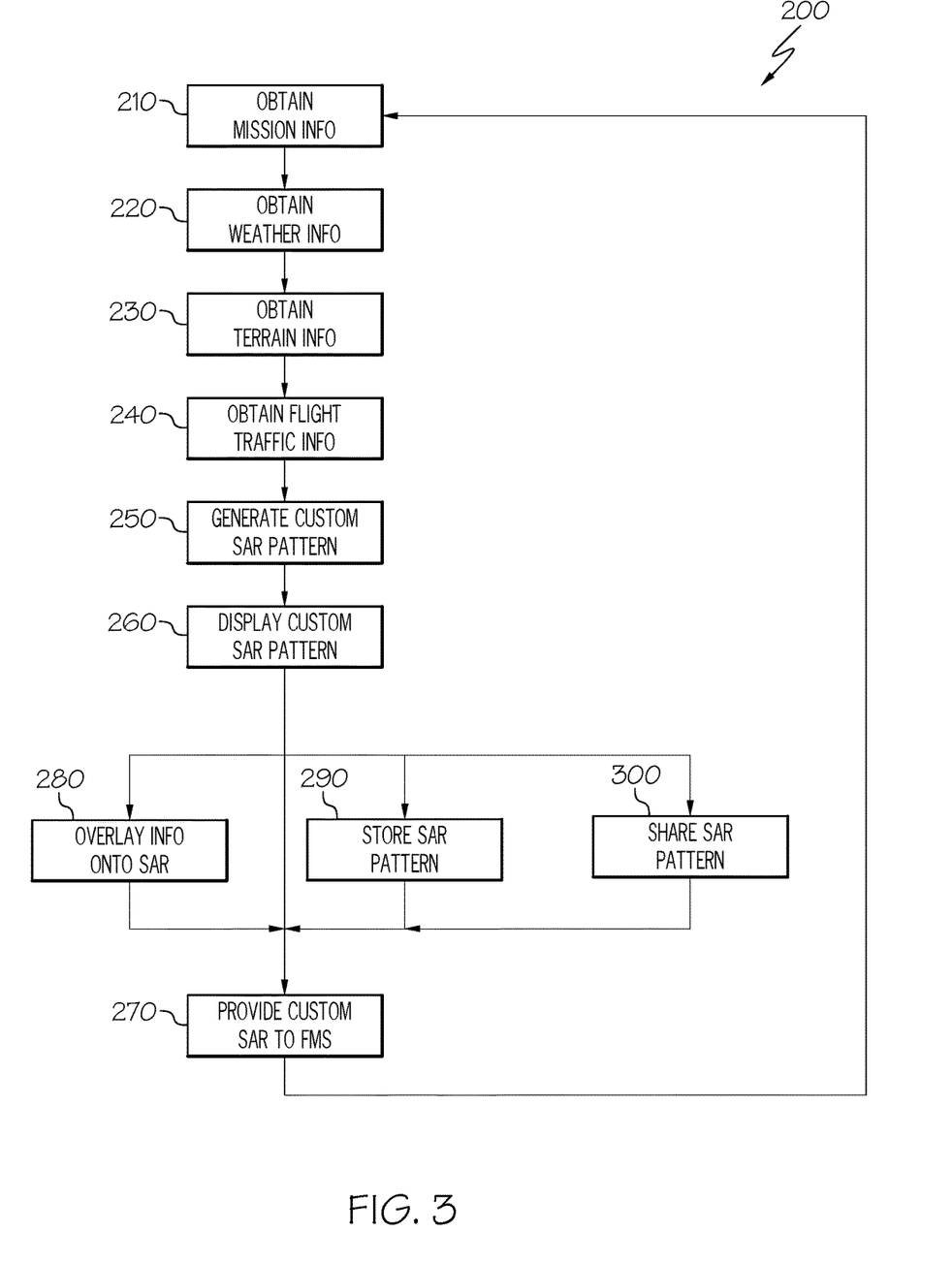
FIG. 3 is a flow diagram of an exemplary method suitable for use with the system of FIG. 1 in accordance with the exemplary embodiments.

With reference now to FIG. 3, and with continued reference to FIGS. 1-2D, a flowchart illustrates a method 200 performed by the system 10 of FIG. 1 in accordance with the present disclosure. As can be appreciated in light of the disclosure, the order of operation within the method 200 is not limited to the sequential execution as illustrated in FIG. 3, but may be performed in one or more varying orders as applicable and in accordance with the requirements of a given application.

In various exemplary embodiments, the system 10 and method 200 are operated based on predetermined events, such as the aircraft 12 taking off for a SAR mission. Method 200 may be performed by the system 10 or may be performed by any other suitable device or system configured in a manner consistent with the teachings of the present disclosure. Unless otherwise noted, the method 200 may be performed by any of the embodiments of the system 10 previously described above.

The method 200 starts at block 210 obtaining mission information for an SAR mission about a search area. In a non-limiting embodiment, the SARPS 60 obtains the mission information 22 from the SAR information database 20. At block 220, the method 200 obtains weather information from a weather source relating to the search area. In a non-limiting embodiment, the SARPS 60 obtains the weather information 32 from the weather source 30 relating to the search area.

At block 230, the method 200 obtains terrain information from a terrain database relating to the search area. In a non-limiting embodiment, SARPS 60 obtains the terrain information 42 from the terrain database 40 relating to the search area. At block 240, the method 200 obtains flight traffic information from a flight traffic source relating to the search area. In a non-limiting embodiment, the SARPS obtains the flight traffic information 52 from the flight traffic source 50 relating to the search area.

At block 250, the method 200 generates a customized SAR pattern using the obtained mission information, the weather information, the terrain information, the flight traffic information, and at least one of a flight crew input, a search team composition, or a combination thereof. In a non-limiting embodiment, SARPS 60 generates the customized SAR pattern using the obtained mission information 22, the weather information 32, the terrain information 42, the flight traffic information 52, and at least one of a flight crew input, the search team composition of aircraft 12, or a combination thereof. At block 260, the method 200 displays the customized SAR pattern to at least one of a flight crew, a ground crew, a search team member, or a combination thereof with a display device. In a non-limiting embodiment, the display device 70 displays the customized SAR pattern 72 to the flight crew.

At block 270, the method 200 provides a flight management system (FMS) with the customized SAR pattern. In a non-limiting embodiment, the FMS 80 is provided with the customized SAR pattern. From block 270, the method 200 returns to block 210 and obtains mission information. In this way, the method 200 generates a customized SAR pattern.

In a non-limiting embodiment, the method 200 further includes block 280 and overlays the weather information and the terrain information onto the customized SAR pattern. In a non-limiting embodiment, the weather information 32 and the terrain information 42 are overlaid onto the customized SAR pattern 72 on the display 70. Following 280, the method 200 proceeds to block 270.

In a non-limiting embodiment, the method 200 further includes block 290 and stores the customized SAR pattern in a SAR pattern database. In a non-limiting embodiment, the SARPS 60 store the customized SAR pattern in the SAR pattern database 90. Following 290, the method proceeds to block 270.

In a non-limiting embodiment, the method 200 further includes block 300 and shares the customized SAR pattern with other aircraft or vehicles in the SAR mission. In a non-limiting embodiment, the SARPS 60 shares the customized SAR pattern with other aircraft or vehicles (not shown) in the SAR mission. Following 300, the method proceeds to block 270.

Figure 4:
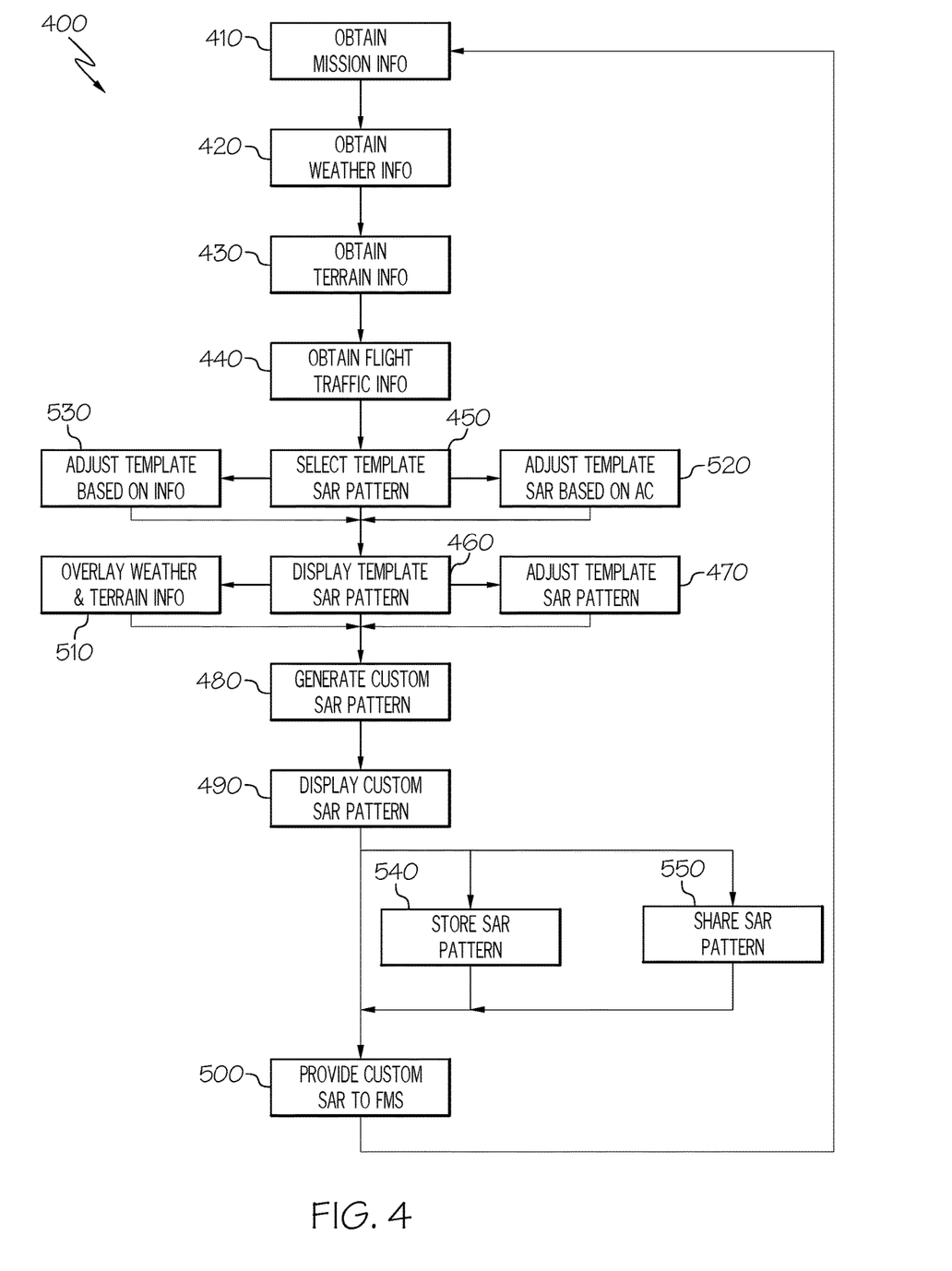
FIG. 4 is a flow diagram of an exemplary method suitable for use with the system of FIG. 1 in accordance with another exemplary embodiment.

With reference now to FIG. 4, and with continued reference to FIGS. 1-3, a flowchart illustrates a method 400 performed by the system 10 of FIG. 1 in accordance with the present disclosure. As can be appreciated in light of the disclosure, the order of operation within the method 400 is not limited to the sequential execution as illustrated in FIG. 4, but may be performed in one or more varying orders as applicable and in accordance with the requirements of a given application. As method 400 contains similar blocks to method 200, the description of method 400 will focus on the differences relative to method 200.

The method 400 starts at block 410 obtaining mission information for an SAR mission about a search area. In a non-limiting embodiment, the SARPS 60 obtains the mission information 22 from the SAR information database 20. At block 420, the method 400 obtains weather information from a weather source relating to the search area. In a non-limiting embodiment, the SARPS 60 obtains the weather information 32 from the weather source 30 relating to the search area.

At block 430, the method 400 obtains terrain information from a terrain database relating to the search area. In a non-limiting embodiment, SARPS 60 obtains the terrain information 42 from the terrain database 40 relating to the search area. At block 440, the method 400 obtains flight traffic information from a flight traffic source relating to the search area. In a non-limiting embodiment, the SARPS obtains the flight traffic information 52 from the flight traffic source 50 relating to the search area.

At block 450, the method 400 selects at least one template SAR pattern from a SAR pattern database using the mission information, the weather information, the terrain information, and the flight traffic information. In a non-limiting embodiment, the SARPS 60 selects at least one template SAR pattern 92 from the SAR pattern database 90 using the mission information 22, the weather information 32, the terrain information 42, and the flight traffic information 52. At block 460, the method 400 displays the at least one template SAR pattern 92 to the flights crew, the ground crew, the search team member, or a combination thereof. In a non-limiting embodiment, the display device 70 displays the customized SAR pattern 72 to the flight crew At 480, the method 400 generates a customized SAR pattern based on the at least one-template SAR pattern. In a non-limiting embodiment, SARPS 60 generates the customized SAR pattern based on the least one template SAR pattern 92. At block 490, the method 400 displays the customized SAR pattern to a flight crew, a ground crew, a search team member, or a combination thereof with a display device. In a non-limiting embodiment, the display device 70 displays the customized SAR pattern 72 to the flight crew, At block 500, the method 400 provides a flight management system (FMS) with the customized SAR pattern. In a non-limiting embodiment, the FMS 80 is provided with the customized SAR pattern. From block 500, the method 400 returns to block 410 and obtains mission information. In this way, the method 400 generates a customized SAR pattern.

In a non-limiting embodiment, the method 400 further includes block 470 adjusts a portion of the at least one template SAR pattern using at least one of a flight crew input, a ground crew input, a search team member input, or a combination thereof. In a non-limiting embodiment, the SARPS 60 adjusts a portion of the template SAR pattern 92 using a flight crew input.

In a non-limiting embodiment, the method 400 further includes block 510 and overlays the weather information and the terrain information onto the at least one template SAR pattern. In a non-limiting embodiment, the weather information 32 and the terrain information 42 are overlaid onto the template SAR pattern on the display 70. Following 510, the method 400 proceeds to block 480.

In a non-limiting embodiment, the method 400 further includes block 520 and adjusts a portion of the template SAR pattern using an aircraft performance parameter. In a non-limiting embodiment, the SARPS 60 adjusts a portion of the template SAR pattern 92 using an aircraft performance parameter of the aircraft 12. Following 520, the method 400 proceeds to block 460.

In a non-limiting embodiment, the method 400 further includes block 530 and adjusts a portion of the template SAR pattern using the mission information, the weather information, the terrain information, the traffic information, or a combination thereof. In a non-limiting embodiment the SARPS 60 adjusts a portion of the template SAR pattern 92 using the mission information 22, the weather information 32, the terrain information 42, the flight traffic information 52, or a combination thereof. Following 530, the method 400 proceeds to 460.

In a non-limiting embodiment, the method 400 further includes block 540 and stores the customized SAR pattern in a SAR pattern database. In a non-limiting embodiment, the SARPS 60 store the customized SAR pattern in the SAR pattern database 90. Following 540, the method proceeds to block 500.

In a non-limiting embodiment, the method 400 further includes block 550 and shares the customized SAR pattern with other aircraft or vehicles in the SAR mission. In a non-limiting embodiment, the SARPS 60 shares the customized SAR pattern with other aircraft or vehicles (not shown) in the SAR mission. Following 550, the method proceeds to block 500, Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A system for customizing a search and rescue (SAR) pattern, the system comprising:
    a SAR pattern database configured to store a plurality of template SAR patterns;
    a SAR information database having stored therein mission information for a SAR mission about a search area;
    a weather source configured to provide weather information relating to the search area;
    a terrain database having stored therein terrain information relating to the search area;
    a flight traffic source configured to provide flight traffic information relating to the search area;
    a search and rescue pattern system (SARPS) in operable communication with the SAR information database, the weather source, the terrain database, and the flight traffic source, the SARPS having a processor configured to obtain the mission information, the weather information, the terrain information, and the flight traffic information, to select at least one template SAR pattern from the SAR pattern database based on the obtained mission information, the weather information, the terrain information, and the flight traffic information, to adjust a portion of the template SAR pattern using an aircraft performance parameter, the SAR mission information, the weather information, the terrain information, the flight traffic information or a combination thereof, and to generate the customized SAR pattern based on the adjusted template SAR pattern;
    a display in operable communication with the SARPS and configured to display the customized SAR pattern; and
    a flight management system (FMS) in operable communication with the SARPS and configured to receive the customized SAR pattern therefrom.

2. The system of claim 1 wherein the display is further configured to display the weather information, the flight traffic information, and the terrain information, and the SARPS is further configured to adjust the customized SAR pattern using a user input relating to the displayed information.

3. The system of claim 1, wherein the SARPS is further configured to store the customized SAR pattern in the SAR pattern database.

4. The system of claim 1, wherein the SARPS is further configured to share the customized SAR pattern with other aircraft or vehicles in the SAR mission.

5. The system of claim 1 wherein the SARPS is further configured to adjust a portion of the at least one of template SAR pattern using a user input.

6. The system of claim 1 wherein the SARPS is further configured to adjust a lateral leg of the template SAR pattern, a vertical leg of the template SAR pattern, or a combination thereof.

7. The system of claim 1 wherein the SARPS is further configured to store the adjusted SAR pattern in the SAR pattern database and share the adjusted SAR pattern with other aircraft or vehicles in the SAR mission.

8. A method for customizing a search and rescue (SAR) pattern, the method comprising:
    obtaining, by a processor, mission information for a SAR mission about a search area;
    obtaining, by the processor, weather information, from a weather source, relating to the search area;
    obtaining, by the processor, terrain information, from a terrain database, relating to the search area;
    obtaining, by the processor, flight traffic information, from a flight traffic source, relating to the search area;
    selecting, by the processor, at least one template SAR pattern from a SAR pattern database based on the mission information, the weather information, the terrain information, and the flight traffic information;
    adjusting, by the processor, a portion of the template SAR pattern using an aircraft performance parameter to generate an adjusted template SAR pattern;
    generating, by the processor, a customized SAR pattern based on the adjusted template SAR pattern;
    displaying, by the processor, the customized SAR pattern to at least one of a flight crew, a ground crew, a search team member, or a combination thereof with a display device; and providing, by the processor, a flight management system (FMS) with the customized SAR pattern.

9. The method of claim 8 wherein the step of displaying further includes overlaying, by the processor, the weather information and the terrain information onto the customized SAR pattern.

10. The method of claim 8, further comprising:
storing, by the processor, the customized SAR pattern in the SAR pattern database.

11. The method of claim 8, further comprising:
sharing, by the processor, the customized SAR pattern with other aircraft or vehicles in the SAR mission.

12. The method of claim 8, further comprising:
displaying, by the processor, the at least one selected template SAR pattern to the flight crew, the ground crew, the search team member, or a combination thereof.

13. The method of claim 12 further comprising:
adjusting, by the processor, a portion of the at least one template SAR pattern using at least one of a flight crew input, a ground crew input, a search team member input, or a combination thereof.

14. The method of claim 12 wherein the step of displaying further includes overlaying, by the processor, the weather information and the terrain information onto the at least one template SAR pattern.

15. A method for customizing a search and rescue (SAR) pattern, the method comprising:
obtaining, by a processor, mission information for a SAR mission about a search area;
obtaining, by the processor, weather information, from a weather source, relating to the search area;
obtaining, by the processor, terrain information, from a terrain database, relating to the search area;
obtaining, by the processor, flight traffic information, from a flight traffic source, relating to the search area;
selecting, by the processor, at least one template SAR pattern from a SAR pattern database based on the mission information, the weather information, the terrain information, and the flight traffic information;
adjusting, by the processor, a portion of the template SAR pattern using the mission information, the weather information, the terrain information, the flight traffic information or a combination thereof to generate an adjusted template SAR pattern;
generating, by the processor, a customized SAR pattern based on the adjusted template SAR pattern;
displaying, by the processor, the customized SAR pattern to at least one of a flight crew, a ground crew, a search team member, or a combination thereof with a display device; and
providing, by the processor, a flight management system (FMS) with the customized SAR pattern.

16. The method of claim 15, further comprising:
storing, by the processor, the customized SAR pattern in the SAR pattern database and sharing, by the processor, the customized SAR pattern with other aircraft or vehicles in the SAR mission.

17. The method of claim 15, further comprising:
sharing, by the processor, the customized SAR pattern with other aircraft or vehicles in the SAR mission.

* * * * *